United States Patent Office 3,405,004
Patented Oct. 8, 1968

3,405,004
FIBROUS ARTICLES HAVING IMPROVED WATER RESISTANCE
Richard H. Hall, Andrew J. Sikkema, and Charles G. Humiston, Midland, William A. Foster, Mapleton, and Junior J. Lamson, Bay City, Mich., assignors to The Dow Chemical Company, Midland, Mich., a corporation of Delaware
No Drawing. Filed Nov. 25, 1964, Ser. No. 413,982
4 Claims. (Cl. 117—155)

ABSTRACT OF THE DISCLOSURE

A process which comprises distributing throughout a fibrous material an aqueous dispersion of a copolymer of a tertiary alkylstyrene such as tertiary-butylstyrene and a conjugated diolefin such as isoprene and drying the resulting composition. The aqueous dispersion is distributed throughout the fibrous material by any of a variety of methods such as by adding the dispersion to a slurry of the fibers (which is then passed onto suitable sheeting equipment) or by applying the dispersion to webs or mats of the fibrous material by roll coating or spraying or by running the webs through vats of the aqueous dispersion. Fibrous products and articles having improved water repellancy are obtained.

---

This invention is directed to a method of increasing the water resistance of fibrous materials such as paper, textiles, leather and the like, and in particular to a new sizing ingredient and a process for its use.

It is known that the deposition of certain resins on fibrous materials such as paper and the like will significantly enhance the water resistance of the material. Although the presently available water resistant fibrous materials constitute a major technical advance, the art continues to seek materials having still greater water resistance.

In accordance with the present invention fibrous materials such as paper and textile products having improved resistance to water penetration are prepared by contacting fibrous product with a copolymer of a conjugated aliphatic diene and a tertiary alkylstyrene having the structural formula

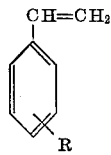

wherein R is a tertiary alkyl group containing 4 to 20 carbon atoms.

The copolymers used in the process of the present invention are formed from about 10 to about 90 percent by weight of the tertiary alkylstyrene and from about 10 to about 90 percent by weight of the conjugated aliphatic diolefin; preferably, the copolymer contains from about 25 to about 85 percent by weight of the tertiary alkylstyrene and from about 15 to about 75 percent by weight of the conjugated aliphatic diolefin.

Illustrative examples of tertiary alkylstyrenes which may be used to prepare the copolymers include para- and meta-tertiary butylstyrene and mixtures thereof, tertiary amylstyrene, tertiary hexylstyrene, tertiary octylstyrene, tertiary dodecylstyrene, tertiary heptadecylstyrene and tertiary eicosylstyrene.

Typical examples of conjugated aliphatic dienes which may be used to prepare the copolymers include 1,3-butadiene (usually referred to simply as "butadiene"), isoprene, 2,3-dimethyl-1,3-butadiene, piperylene, chloroprene, 2,3-dichloro-1,3-butadiene and cyclopentadiene.

The copolymers useful in the process of the present invention may be prepared by subjecting the monomers to the polymerization methods conventionally used with free radical catalyzed aqueous systems, i.e., emulsion-, and solution polymerization in the presence of actinic light, ultra-violet irradiation, gamma radiation, "azo" catalyst and peroxides.

The tertiary alkylstyrene/conjugated diolefin copolymers are conveniently applied to the fibrous material as an aqueous dispersion or "latex."

The aqueous dispersion of the tertiary alkylstyrene copolymer can be prepared by aqueous emulsion polymerization of the corresponding monomers or by post dispersing the preformed copolymer, preferably by emulsion polymerization as it is the most convenient and economical procedure. As a general rule, the amount of copolymer solids in the aqueous dispersion ranges from about 20 to about 50 percent and preferably about 30 to about 40 percent by weight of the dispersion. The dispersion may be diluted to reduce the solids content prior to treatment of the fibrous material. The aqueous dispersion of the copolymer also ordinarily includes a surfactant in addition to the aqueous dispersed colloidal particles of the polymer for the purpose of stabilizing the dispersion. The concentration of surfactant can be the usual proportion of 0.5 to 10 percent based on the weight of the copolymer. The surfactant, preferably water soluble, can be non-ionic, anionic or cationic.

The aqueous dispersion of copolymer can be applied to the surface of the fibrous material such as paper or textile by any of a variety of conventional methods which will distribute the copolymer substantially uniformly throughout the fibrous material as for example running the materials through vats of the aqueous dispersion, roll coating or spraying. After the aqueous dispersion of the copolymer is applied to the surface of the article, the article is dried usually at a temperature of 100° to 190° C. for a time sufficient to effect removal of the aqueous carrier; lower drying temperatures may be employed, but at these lower temperatures, the time necessary for drying may be impracticable for commercial purposes.

In case of paper articles an alternative method for treating the paper with the copolymer may be effected by incorporating the copolymer in the paper stock prior to the formation of sheets therefrom. Thus an aqueous dispersion of the tertiary alkylstyrene/conjugated aliphatic diolefin copolymer may be added to an aqueous slurry of the paper pulp and most conveniently the aqueous dispersion of the copolymer may be introduced into the pulp slurry at any point prior to formation of the web, preferably after the beating cycle.

After adding the copolymer additament to the pulp slurry the treated and suitably refined aqueous fiber slurry is passed onto any suitable sheeting equipment whereupon the fibrous suspended solids are felted from the aqueous dispersing medium in the form of a web-like sheet. Usually, these operations are continuous in nature and may be accomplished with such machines as the Fourdrinier paper machine and the like. The wet felted web may then be subjected to drying prior to calendering and/or coating and/or other finishing operations.

The exact amount of copolymer used to treat the fibrous material may vary depending on the nature of the base article to which the copolymer is to be applied, the means of application of the copolymer and the degree of water repellency desired. In general, from about 0.05 to about 3 percent by weight of the copolymer based on the weight of the article to be treated is employed. Higher amounts of up to about 25 percent of the copolymer may be required for special papers or textiles or circumstances.

To illustrate the manner in which the invention may be carried out, the following examples are given. It is to be understood, however, that the examples are for the purpose of illustration and the invention is not to be regarded as limited to any of the specific materials or conditions recited therein. Unless otherwise stated, all percentages cited in the examples below are based on weight.

Example I

A copolymer comprised of 75 percent p-tertiary butylstyrene and 25 percent isoprene was prepared as follows:

Into a 2 liter stirred reaction flask in a thermostatically controlled water bath held at 30° C. was added 800 grams of deionized water, 20 grams of a cationic dispersant, Siposan 7LUF (55% active), an alkyl dimethyl benzyl ammonium chloride manufactured by Alcolac Chemical Corporation. The pH of the reaction mixture was adjusted to 3.5 with acetic acid and the mixture was stirred with a $N_2$ purge for 30 minutes whereupon 30 grams of tertiarybutylstyrene, 10 grams distilled isoprene and 0.5 gram cumene hydroperoxide (70% active) was added to the reaction flask. To the reaction flask was then added the following reactants which were continuously pumped into the flask in separate streams:

| Stream No | Composition of stream | Amount of reactants (grams) | Rate of addition to flask (grams/hr.) |
|---|---|---|---|
| 1 | Formaldehyde sodium sulfoxylate | 4.0 | 10 |
|  | Deionized water | 396 |  |
| 2 | Tertiary-butyl styrene | 450 | 30 |
|  | Isoprene (distilled) | 150 |  |
|  | Cumene hydroperoxide (70% active) | 5.1 |  |
| 3 | Siposan 7 LUF (55% active) | 40 | 13 |
|  | Deionized water (pH adjusted to 3.5 with acetic acid) | 360 |  |

Stream number 1 was pumped into the flask, and after 0.25 hour, 0.05 cc. of $Fe^{+++}$ solution was added to the flask. In about 0.5 hour a bluish color appeared and the addition of streams 2 and 3 was then initiated. The addition of stream 1 was continued for about 3 hours after the addition of streams 2 and 3 was completed.

The resulting dispersion was collected and was found to have a solids content of 29 percent. Portions of the dispersion were diluted with deionized water to obtain treating solutions containing varying amounts of the copolymer ranging from 0.1 percent to 1 percent by weight.

Strips, 6" x 11" were cut from unbleached waterleaf kraft paper, weighed and then dipped in the copolymer dispersions for 2 minutes. Upon removal, the strip was blotted to remove excess treating material and then cured on a hot plate for 4 minutes at 120° C. After curing the strips were reweighed to determine the amount of copolymer deposited on the surface of the paper strip.

The treated papers were then evaluated for water repellency, dry tensile strength and fold endurance.

Water repellency was determined using a KBB size tester manufactured by Testing Machines, Inc.

The instrument measures the time (in seconds) required to establish a flow of a given quantity (80 microamps) of electricity through a paper specimen placed between a lower zinc electrode and an upper, water soaked porous bronze electrode. The longer the time interval the greater the water repellency of the specimen.

Dry tensile tests were run on 0.5 x 7 inch strips of paper according to a test described under TAPPI (Technical Association for the Pulp and Paper Industry) designation T404–05–61.

Fold endurance was determined according to a test known as the "MIT Folding Endurance" test and is described under TAPPI designation T423 m–50. Folding endurance is a measure of the strength of the treated paper and is recorded as the total number of double folds required to sever the paper at the crease when a uniform folding rate (175 double folds per minute) is used, and the strip is under a tension of 1.5 kg.

The water repellency, dry tensile strength and fold endurance of the treated papers are recorded in Table I below.

The water repellency, dry tensile strength and fold endurance of unbleached waterleaf kraft paper treated in the above manner with aqueous dispersions of emulsion polymerized copolymers prepared by reacting p-tertiary butylstyrene and isoprene at monomer ratios of 87.5/12.5 and 50/50 respectively following the polymerization procedure described above are also recorded in Table I below.

For purposes of contrast, the water repellency, dry tensile strength and fold endurance of untreated unbleached waterleaf kraft paper (sample number 24) as well as the kraft paper treated with varying concentrations of p-tertiary butylstyrene homopolymer following the above treating procedure (sample numbers 18 to 23) are also recorded in Table I below.

Only sample numbers 1 through 17 are examples of this invention; other samples are for purpose of comparison and contrast.

TABLE I

| Sample No. | Composition of copolymer (percent by weight) | | Amount [1] of copolymer deposited on paper surface (percent) | KBB size (sec.) | Dry tensile (lbs./0.5" x 7" strip) | MIT fold (1.5 kg. wt.) |
|---|---|---|---|---|---|---|
|  | p-Tert. butylstyrene | Isoprene |  |  |  |  |
| 1 | 87.5 | 12.5 | .27 | 7.8 | 16.96 | 198 |
| 2 | 87.5 | 12.5 | .78 | 56.2 | 16.32 | 208 |
| 3 | 87.5 | 12.5 | 1.41 | 87.3 | 16.19 | 216 |
| 4 | 87.5 | 12.5 | 1.52 | 90.1 | 16.46 | 240 |
| 5 | 87.5 | 12.5 | 1.85 | 95.5 | 17.22 | 177 |
| 6 | 87.5 | 12.5 | 2.34 | 103.9 | 16.98 | 190 |
| 7 | 75.0 | 25.0 | .21 | 112.1 | 16.94 | 217 |
| 8 | 75.0 | 25.0 | .73 | 111.2 | 17.83 | 143 |
| 9 | 75.0 | 25.0 | 1.49 | 126.5 | 17.91 | 151 |
| 10 | 75.0 | 25.0 | 1.79 | 120.0 | 18.20 | 139 |
| 11 | 75.0 | 25.0 | 2.08 | 137.8 | 17.22 | 166 |
| 12 | 75.0 | 25.0 | 2.59 | 141.6 | 18.04 | 209 |
| 13 | 50.0 | 50.0 | .27 | 77.4 | 17.50 | 159 |
| 14 | 50.0 | 50.0 | .82 | 98.9 | 18.12 | 172 |
| 15 | 50.0 | 50.0 | 1.46 | 118.4 | 17.51 | 120 |
| 16 | 50.0 | 50.0 | 1.80 | 119.1 | 17.86 | 175 |
| 17 | 50.0 | 50.0 | 2.09 | 139.6 | 17.76 | 216 |
| 18 | 100.0 | 0.0 | .33 | 0.4 | 16.58 | 186 |
| 19 | 100.0 | 0.0 | .76 | 2.1 | 16.12 | 103 |
| 20 | 100.0 | 0.0 | 1.51 | 5.6 | 16.75 | 158 |
| 21 | 100.0 | 0.0 | 1.85 | 14.4 | 17.52 | 149 |
| 22 | 100.0 | 0.0 | 1.96 | 21.3 | 16.42 | 136 |
| 23 | 100.0 | 0.0 | 2.55 | 54.4 | 17.52 | 172 |
| 24 | Control (no treatment) |  | 0.00 | 0.3 | 16.75 | 130 |

[1] Based on dry weight of pulp.

By referring to Table I it is at once apparent that paper sheet treated with the p-tertiary-butylstyrene copolymer (sample numbers 1 through 17) showed a substantial increase in water repellency over paper sheet treated with equivalent amounts of the p-tertiary-butylstyrene homopolymer and without any diminution in dry tensile strength or fold endurance when compared to the homopolymer treatment or the control sample.

Example II

The effectiveness of the p-tertiary butylstyrene/isoprene copolymers described in Example I as additives to paper pulp to improve the water resistance of products prepared therefrom was determined according to a standard laboratory procedure. According to this laboratory procedure, unbleached hardwood pulp treated with sulfuric acid was formed into a well beaten aqueous suspension (Canadian Standard freeness of 400 ml.) and 2 percent of alum based on the fibers therein was added to the slurry diluted to approximately 0.4 percent consistency to provide optimum sulfate ion concentration; the pH of the slurry was 4.2. To separate portions of the slurry was then added, with stirring, aqueous dispersions diluted to 1 percent solids concentration of copolymers formed from varying proportions of comonomers in the concentrations shown in Table II below. Handsheets were prepared (according to a modification of TAPPI standard T205-m-53) (using a Williams handsheet machine at 70.3 gm./m.$^2$ basis weight). Each sheet was then dried in a Hydrolaire laboratory press for 4 minutes, the top platen of which was heated to 120° C. The dried sheets were conditioned for 48 hours at 73° F. and 50 percent relative humidity and tested for water resistance, dry tensile strength and fold endurance according to the testing procedures described in Example I.

For purposes of contrast the water repellency, dry tensile strength and fold endurance of paper sheets prepared from unbleached hardwood pulp to which no polymeric additive had been incorporated (sample number M) as well as paper sheets prepared from unbleached hardwood pulp to which varying concentrations of p-tertiary butylstyrene homopolymer had been added (sample numbers J to L) following the procedures are also recorded in Table II below. Only sample numbers A through I are examples of this invention.

compared to the homopolymer treatment or the control sample (sample number M).

Example III

Unbleached hardwood soda pulp was beaten to a Canadian Standard Freeness of 390 milliliters, and a 5 gram aliquot of the pulp was used to prepare a handsheet from the pulp. The pulp slurry was diluted to about 0.5 percent consistency and 1.0 percent of a 50 percent p-tertiary-butylstyrene/50 percent isoprene copolymer based on the dry fiber weight of the pulp was added to the pulp slurry as a 1.0 percent solids dispersion. To the pulp slurry was added 3 percent alum based on the dry fiber. A handsheet was made from the pulp slurry on a Williams handsheet machine at 70.3 gm./m.$^2$ basis weight. The wet handsheet was dried in an Elmes laboratory hot press at 115° C. for 4 minutes. The dried papers were conditioned for 48 hours at 73° F. and 50 percent R.H. The handsheet when tested in the KBB size machine required 201.9 seconds to establish a flow of 80 microamps through the paper.

By way of contrast, a handsheet prepared in a manner identical to the above with the exception that the pulp slurry was treated with 1 percent of a 50 styrene/50 isoprene copolymer required 112.9 seconds to establish a flow of 80 microamps through the paper.

In a similar manner other fibrous materials such as cotton textiles, synthetic fibers or leather are treated with equivalent amounts of copolymers formed from the other tertiary alkylstyrenes and conjugated aliphatic diolefins mentioned above so as to improve the water repellency of the fibrous material.

What is claimed is:

1. A fibrous material of improved water repellency having a copolymer of a tertiary alkylstyrene having the structural formula

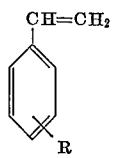

wherein R is a tertiary alkyl group containing 4 to 20 carbon atoms and a conjugated aliphatic diolefin distributed

TABLE II

| Sample No. | Composition of copolymer | | Amount[1] of copolymer incorporated in pulp (percent) | KBB size (sec.) | Dry tensile (lbs./0.5" x 7" strip) | MIT fold (1 kg. wt.) |
| --- | --- | --- | --- | --- | --- | --- |
| | p-Tert. butylstyrene | Isoprene | | | | |
| A | 87.5 | 12.5 | 0.10 | 4.9 | 9.24 | 8 |
| B | 87.5 | 12.5 | 0.25 | 53.7 | 9.12 | 10 |
| C | 87.5 | 12.5 | 0.50 | 68.5 | 9.49 | 7 |
| D | 75.0 | 25.0 | 0.10 | 0.3 | 9.26 | 9 |
| E | 75.0 | 25.0 | 0.25 | 64.1 | 9.33 | 14 |
| F | 75.0 | 25.0 | 0.50 | 79.1 | 9.28 | 9 |
| G | 50.0 | 50.0 | 0.10 | 4.8 | 9.50 | 11 |
| H | 50.0 | 50.0 | 0.25 | 62.3 | 9.35 | 11 |
| I | 50.0 | 50.0 | 0.50 | 85.2 | 9.51 | 9 |
| J | 100.0 | 0.0 | 0.10 | 2.0 | 9.14 | 9 |
| K | 100.0 | 0.0 | 0.25 | 1.9 | 9.36 | 10 |
| L | 100.0 | 0.0 | 0.50 | 1.3 | 8.96 | 7 |
| M | Control (no treatment) | | 0.00 | 0.4 | 8.98 | 10 |

[1] Based on dry weight of pulp.

By referring to Table II, it is at once apparent that paper sheets prepared from pulp slurries treated with the p-tertiary butylstyrene copolymer (sample numbers A through I) showed a substantial increase in water repellency over paper sheets prepared from pulp slurries treated with equivalent amounts of the p-tertiary-butylstyrene homopolymer (sample numbers J–L) and without any diminution in dry tensile strength or fold endurance when substantially uniformly throughout the fibrous material, said copolymer being formed from between about 10 to about 90 percent by weight of the tertiary alkylstyrene and about 10 to about 90 percent by weight of the conjugated diene, said copolymer being present in the amount of from about 0.05 to about 25 percent based on the weight of the fibrous material.

2. A paper article of improved water repellency having a copolymer of a tertiary alkylstyrene having the structural formula

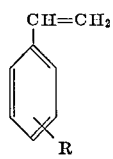

wherein R is a tertiary alkyl group containing 4 to 20 carbon atoms and a conjugated aliphatic diolefin distributed uniformly throughout the paper, said copolymer being formed from between about 25 to about 85 percent by weight of the tertiary butylstyrene and about 15 to about 75 percent by weight of the conjugated diene, said copolymer being present in the amount of from about 0.1 to about 3.0 percent based on the weight of the paper.

3. The paper article of claim 2 wherein the tertiary alkylstyrene is p-tertiary butylstyrene.

4. The paper article of claim 2 wherein the conjugated aliphatic diolefin is isoprene.

References Cited

UNITED STATES PATENTS

| | | |
|---|---|---|
| 2,537,114 | 1/1951 | Young et al. |
| 2,554,899 | 5/1951 | Cowgill. |
| 2,597,087 | 5/1952 | Cowgill. |
| 2,605,242 | 7/1952 | Betts et al. |
| 2,611,719 | 9/1952 | Borders. |
| 2,917,407 | 12/1959 | Cipriano et al. |
| 3,013,926 | 12/1961 | Railsback et al. |

OTHER REFERENCES

Marvel, C. S. et al., Copolymers of Butadiene With Alkyl, Aryl, Alkoxyl, and Phenoxyl Styrenes, Ind. Eng. Chem., vol. 40, No. 12 (1948), pp. 2371–3, TS IA58.

WILLIAM D. MARTIN, *Primary Examiner.*

M. LUSIGNAN, *Assistant Examiner.*